United States Patent [19]
Bevacco et al.

[11] Patent Number: 5,329,646
[45] Date of Patent: Jul. 19, 1994

[54] DRAIN FLUSHER DEVICE

[75] Inventors: Marc P. Bevacco, New Hope, Minn.; Steven J. Hiemsoth, Knoxville, Tenn.

[73] Assignee: Cherne Industries Incorporated, Minneapolis, Minn.

[21] Appl. No.: 55,684

[22] Filed: Apr. 29, 1993

Related U.S. Application Data

[63] Continuation of Ser. No. 768,812, Sep. 27, 1991, abandoned.

[51] Int. Cl.$^5$ ................................. E03D 9/00
[52] U.S. Cl. ........................... 4/255.08; 4/255.09
[58] Field of Search ............ 4/255.01, 255.04, 255.08, 4/255.09, 295; 134/167 C

[56] References Cited

U.S. PATENT DOCUMENTS

| | | | |
|---|---|---|---|
| D. 234,768 | 4/1975 | Warsinger | D23/34 |
| 3,086,540 | 4/1963 | Anderson | 134/167 C |
| 3,595,255 | 7/1971 | Mulinex | 4/255.08 X |
| 3,660,863 | 5/1972 | Gerbasi | 15/1.51 X |
| 3,792,708 | 2/1974 | Tash | 134/167 C |
| 3,802,449 | 4/1974 | Mulinex | 4/255.09 X |
| 3,840,033 | 10/1974 | Warsinger | 4/255.09 X |
| 3,937,404 | 2/1976 | Johnson | 4/255.09 |
| 4,076,564 | 2/1978 | Fisher | 15/256.51 X |
| 4,203,473 | 5/1980 | Roberson, Sr. | 4/255.01 X |
| 4,475,255 | 10/1984 | Tash | 4/255.09 X |
| 4,591,194 | 5/1986 | Tash | 285/249 |
| 4,660,603 | 4/1987 | Tash | 138/92 |
| 4,672,988 | 6/1987 | Tash | 134/167 C |
| 4,790,356 | 12/1988 | Tash | 4/255.09 X |
| 4,825,900 | 5/1989 | Tash | 4/255.09 X |
| 4,865,062 | 9/1989 | Tash | 4/255.09 X |
| 5,035,266 | 7/1991 | Benson et al. | 4/295 X |
| 5,125,425 | 6/1992 | Folts et al. | 134/167 C |

OTHER PUBLICATIONS

G. T. Water Products, Inc. Product Brochure, 1985, pp. 1–5.
Peterson Products Co., Product Brochure, pp. 1–4.

*Primary Examiner*—William A. Cuchlinski, Jr.
*Assistant Examiner*—John L. Beres
*Attorney, Agent, or Firm*—Anthony G. Eggink

[57] ABSTRACT

A drain flusher device for dislodging an obstruction in a pipe. The drain flushing device has an elastomeric cylindrical body with an open neck end and nose portion having a thickened end wall. An elongated slit with a predetermined configuration and predetermined dimensions extends through the thickened forward end wall. A connector is fixed at the body neck end and is adapted for attachment to a pressurized fluid source, such as a garden hose.

20 Claims, 4 Drawing Sheets

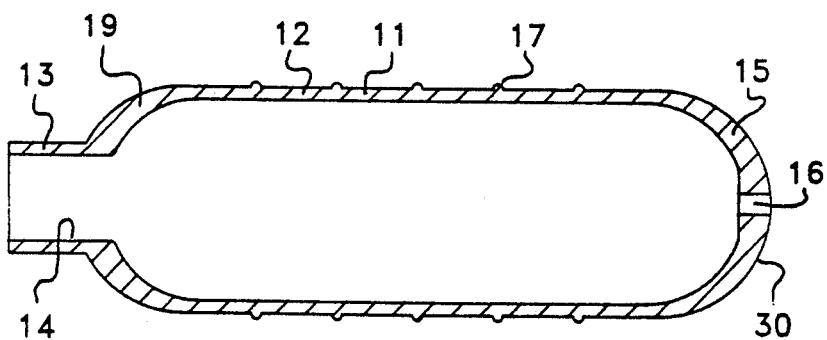
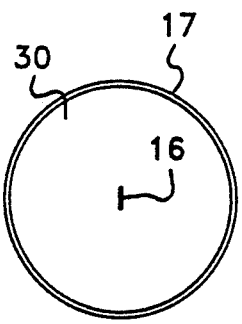
FIG. 3  FIG. 4
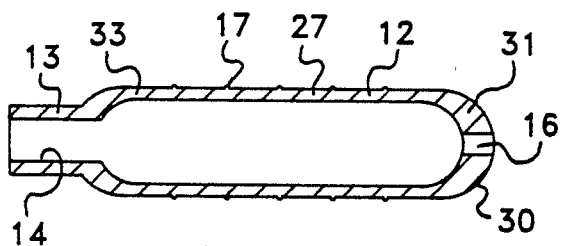
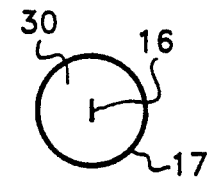
FIG. 5  FIG. 6
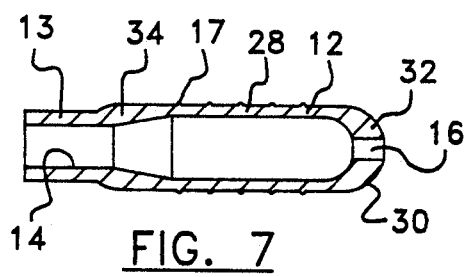
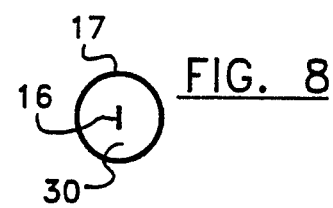
FIG. 7  FIG. 8
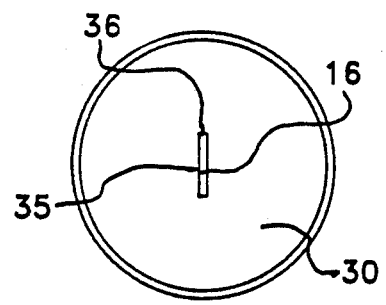
FIG. 9

DRAIN FLUSHER DEVICE

This is a continuation of application Ser. No. 07/768,812 filed on Sep. 27, 1991 now abandoned.

BACKGROUND OF THE INVENTION

This invention relates generally to a drain flusher device and particularly to a drain flusher device which expands upon the introduction of fluid pressure to seat the device in a pipeline or similar conduit. The drain flusher device of this invention has an improved flexible body structure with a forward end integrating an improved discharge outlet configuration to direct a concentrated fluid spray to dislodge pipeline obstructions or debris to improve fluid flow.

Various drain flushing devices have been proposed in the past. Typically, these prior art devices have utilized various valve structures to initially develop an internal pressure in the flushing device body to seat the device in the pipeline. Upon further introduction of fluid pressure the valve structure is opened to provide a fluid spray to dislodge the obstruction. Other devices have been proposed which utilize a resilient body structure with a restricted opening at the body forward end. Upon the introduction of fluid pressure into such devices the body is also expanded initially for seating in the pipeline, although some fluid escapes through the restricted opening. Upon further fluid introduction, the fluid escapes through the restricted opening in a concentrated spray. These latter devices use restricted openings of a circular configuration.

The prior art drain flushing devices have specific functional drawbacks in operation and, particularly, those that utilize valves are difficult and expensive to manufacture. Specifically, the valved drain flusher devices are advantageous for purposes of initial seating of the respective devices in the pipeline. Subsequently, the valves open and provide the concentrated fluid stream to dislodge the drain obstruction. The drain flusher devices that have been proposed having the restricted openings, expel considerable volumes of fluids upon initial fluid introduction, thereby, making the initial seating of the device more difficult. Subsequent the pressure build-up in the device body, fluid is expelled through the restricted opening for obstruction dislodgement, however, the configuration of the circular restricted opening limits the concentrated fluid flow that is able to be passed therethrough. Thus, in these proposed prior art devices, the initial diameter of the circular opening is limited by the proper seating requirement of the device body. Consequently, the resultant concentrated fluid flow that is able to be passed through the circular opening after the device body has been seated is, thereby, limited.

The drain flusher device of this invention provides a structure that overcomes the difficulties and limitations of these prior art devices. The drain flusher devices of this invention provide the benefits of the valved drain flushers in that the device body is initially able to be fully seated in the pipeline during the seating process and before excessive expulsion of a concentrated fluid spray. The drain flushers of this invention also provide the benefits of those proposed devices that utilize the circular restricted openings in that they are relatively inexpensive to manufacture. And despite the need for an economical and functional device which overcome the limitations of the art and which provide the benefits of this invention, none as far as is known has been developed or proposed.

SUMMARY OF THE INVENTION

The present invention provides a drain flusher device used in clearing obstructions from pipelines or other fluid conduits. The device is constructed and arranged to initially seat in the pipeline and then to introduce a concentrated, pressurized fluid spray through a slit aperture to dislodge the obstruction.

The drain flushing device comprises an elastomeric cylindrical body of a specified diameter with a thickened end wall and an open neck end. An elongated slit of a predetermined length and width is provided through the body thickened end. The dimensions of the slit opening is independent of body diameter in the range described. The slit opening is specifically sized to be used with a fluid source, such as that obtained from a standard garden hose. The drain flusher device has a connector attached to the body neck and is adapted for attachment to a pressurized fluid source, such as a standard water hose. The elongated slit is approximately 0.250 inches in length and has a maximum slit width of approximately 0.032 inches. The body diameter of the device varies from approximately 0.75 to 3.25 inches for flusher devices designed for use in pipe diameters ranging from one to six inches. The thickened wall end is approximately 250–325 percent thicker than the side wall thickness of the body. The outside lateral surface of the device body further has at least one circumferentially disposed sealing rib.

These and other benefits of this invention will become clear from the following description by reference to the drawings.

BRIEF DESCRIPTION OF THE DRAWINGS

FIG. 3 is a lateral cross-sectional view showing the body structure of the drain flusher device of FIG. 1;

FIG. 4 is a frontal plan view showing the hemispherical end of the body structure of the flusher device of FIG. 3;

FIG. 5 is a lateral cross-sectional view showing another embodiment of the drain flusher device body;

FIG. 6 is a frontal end view of the drain flusher device body of FIG. 5;

FIG. 7 is a lateral cross-sectional view showing another embodiment of the drain flusher device body;

FIG. 8 is a frontal end view of the drain flusher device body of FIG. 7;

FIG. 9 is a frontal view of the elongated slit in the frontal end of the drain flusher body;

DESCRIPTION OF THE PREFERRED EMBODIMENTS

Figure 1:
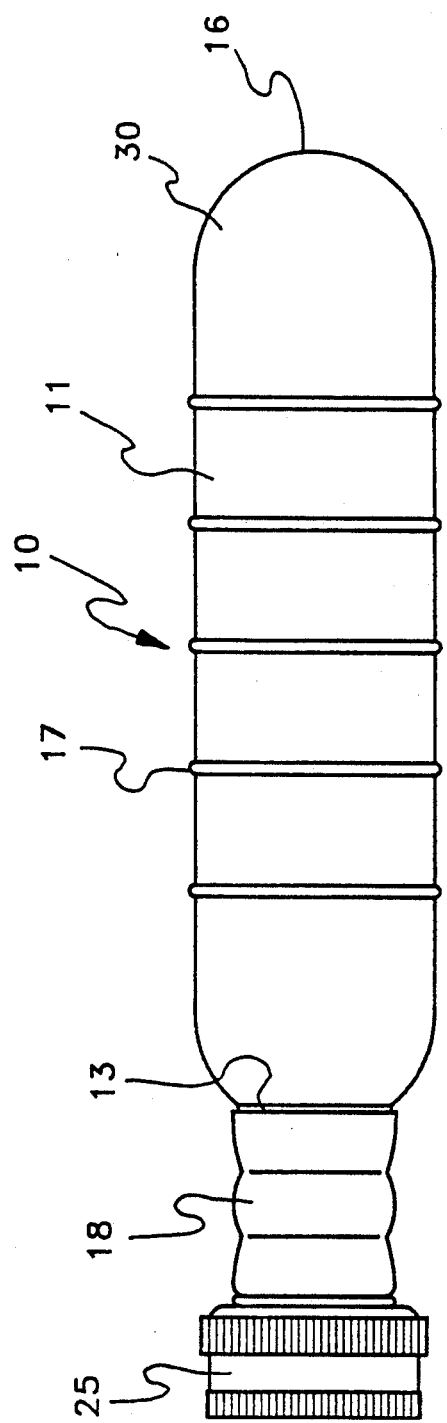
FIG. 1 is a lateral plan view showing the drain flusher device of this invention.

FIG. 1 shows the drain flusher device 10 having an elastomeric body 11 with a hemispherical nose portion 30 and a connector assembly 18 attached at the neck portion 13. The connector assembly 18 is shown to have a connector head 25 for attachment to a fluid source. The connector assembly 18 is preferably a threaded connector which is adapted to receive a hose type connection. The drain flushers 10 of this invention are for use with standard hoses, such as garden hoses, which normally provide water pressures of approximately 50–90 p.s.i.g.

Figure 2:
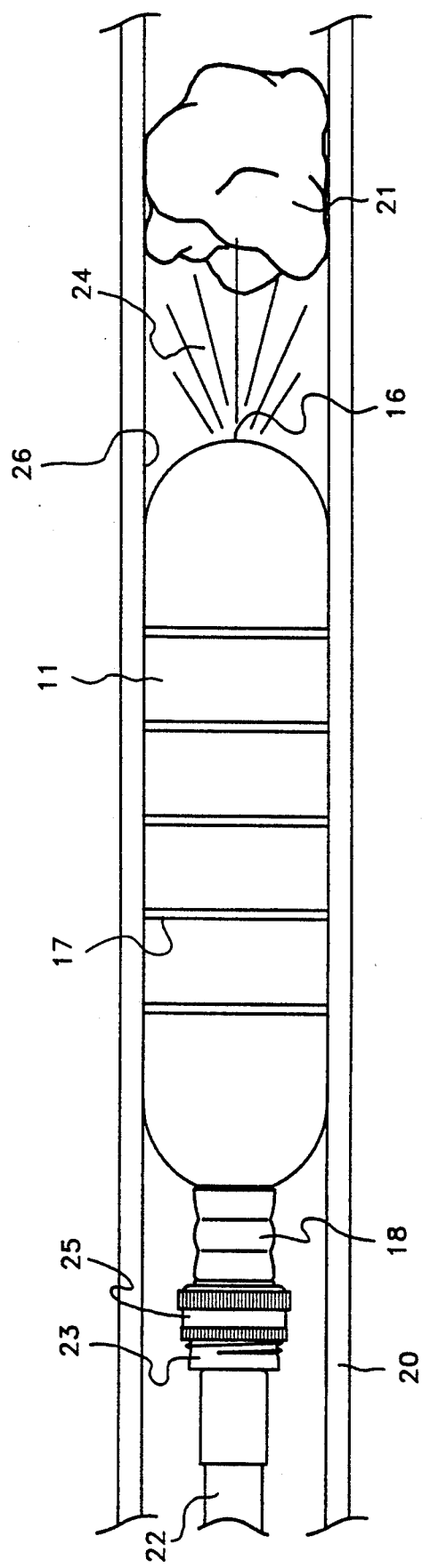
FIG. 2 is a lateral plan view showing the drain flusher device in use in a pipeline.

FIG. 2 shows the drain flusher 10 in an inflated state and seated in pipeline 20. The connector head 25 of the drain flusher connector 18 is shown attached to the connector end 23 of a garden hose 22. As will be further described, the elastomeric body 11 is initially expanded by the fluid pressure from hose 22. Circumferentially disposed sealing ribs 17 are provided on the exterior of the elastomeric body 11 to seal the body 11 against the inner wall 26 of the pipeline 20. Once seated within the inner wall 26 of pipeline 20, the aperture 16 in the end wall 14 further opens to provide a concentrated fluid spray 24 to dislodge obstruction 21.

FIG. 3 shows a sectional view of the elastomeric flusher body 11. The elastomeric body 11 has a thickened end wall 15 having a slit aperture 16. The body 11 is constructed of a molded elastomeric material with a lateral wall 12 having a plurality of circumferentially disposed and spaced sealing ribs 17. The unitary body 11 is further shown to have a thickened end wall 19 adjacent the neck portion 13. The connector assembly 18, shown in FIG. 1, is attached to the neck portion 13 in the usual manner where inner and outer sleeves are clamped about neck portion 13 to form the connector assembly 18. The thickened end wall 19 permits the connector assembly 18 to be securely retained at the neck portion 13. Particularly, it has been found that a thickened end wall 19 allows use of a wider range of body 11 elastomeric materials, i.e., range of durometer related properties.

FIG. 4 shows the hemispherical forward end 30 of the device body 11 having a centrally disposed slit aperture 16. The dimensions of the slit aperture 16 as well as the cooperating wall thickness features of the body 11 are important to the operation of the flusher device 10 of this invention. The predetermined dimensions of the slit aperture 16, as will be further discussed, have been found to be independent upon body diameter of the flusher 10 in the body diameter range discussed. Although hemispherical nose ends 30 are shown and described herein, other nose end configurations are possible. It has been found, however, that hemispherical nose end configurations are preferred for ease of drain flusher installation and use in pipeline structures.

FIGS. 5 and 6 show another embodiment of the drain flusher body. The body structure 27 is shown to have a thickened wall end 31 at nose portion 30 and a thickened open end wall 33 is provided adjacent the neck portion 13. Further, FIGS. 7 and 8 show lateral and frontal views, respectively, of another elastomeric flusher body structure 28. The body structure 28 has a thickened end wall 30 at nose portion 30 and a sloping thickened open end wall section 34 is provided adjacent the neck portion 13. Although the body dimensions, i.e., body length and diameter as well as the wall configurations, may vary between these flusher embodiments, the slit aperture 16 configuration and dimensions for each of these embodiments is generally the same. It has been found that a slit aperture having the configuration shown in FIGS. 4, 6 and 8 is independent upon body size and is more dependent upon the pressure and flow capacity of the fluid source. The drain flusher body configurations shown in FIGS. 3–8 can be utilized in drain pipes or conduits with outside diameters up to approximately twice the nominal outside diameter of the drain flusher body.

The drain flusher bodies 10, 27 and 28 are preferably molded of an elastomeric material such as natural rubber or synthetic elastomers such as neoprene, butyl rubber, nitrile rubber or the like. It has been found that elastomeric materials having durometer readings between of 55–65 Shore A, having an elongation of 300–550 percent and a minimum tensile strength of 1800 p.s.i. are preferred for the unitary body structures. These flusher bodies can be economically manufactured using injection or compression molding processes.

Importantly, as shown in FIG. 9, the slit aperture 16 is elongated and has a length 35 which is substantially greater than its width 36. It has been found that a slit aperture having a length of approximately 0.250 inches and a width of approximately 0.030 inches provides an effective aperture configuration for use with normal water pressures (i.e. 50–90 p.s.i.g.) and for a range of drain flusher sizes. An elongated slits having a length to width ratio of approximately 7.75–8.00 to one has been found preferable for the flusher devices of this invention. Flusher devices having usable diameters for 1–2 inch (25–50 mm) pipe diameters, 1.5–3 inch (38–75 mm) pipe diameters and 4–6 inch (101–152 mm) pipe diameters are preferred in most home applications where water hose connectors are commonly used.

The 0.250 by 0.030 inch slit aperture as discussed above and shown in FIG. 9 has been found preferable with the pipeline flushers of this invention. Further, the depth of the slit aperture 16 or the thickness of the end wall of approximately 0.375–0.390 inches has also been found useful. A slit length to slit depth ratio of approximately 1.4–1.6 has been found preferable for effective slit aperture opening in response to fluid pressure. It has also been found that this slit configuration provides an unexpected benefit over prior art devices. Specifically, the narrow and relatively long slit configuration permits the plug device body 11 to initially expand in the pipeline with minimal relative expulsion of fluid which is common in valveless devices. After seating and fluid pressure build-up, the slit aperture fully opens to provide a larger area of concentrated fluid spray then that realized from prior art devices having circular restricted openings.

As discussed, the slit aperture configuration 16 functions in cooperation with the body 11 configuration. It has been found that a thickened end wall 15 that is approximately 300 percent thicker than lateral wall thickness 12 cooperates with the centrally disposed slit aperture 16. The end wall thickness defines the slit aperture depth and relates to the slit aperture length to depth ratio.

In summary, the drain flusher 10 is economical to manufacture and easy to use. The flusher device 10 readily connects to a garden hose or laundry tub hose connection. With the use of a faucet thread adapter, a garden hose can be connected to common kitchen and bathroom sinks. The drain flusher is preferably inserted as far as possible into the pipeline, normally a minimum of 6". When cold water is turned on full force, the flusher body initially expands, seats and then dislodges the pipeline blockage or obstruction.

Figure 10:
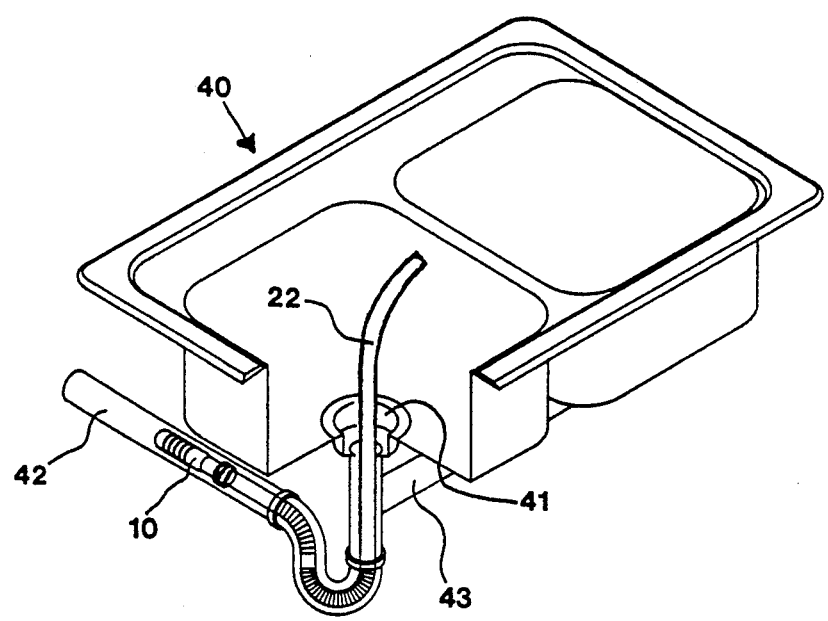
FIG. 10 is a perspective view of a sink and showing the drain flusher device in use to clear a drain pipe.
Figure 11:
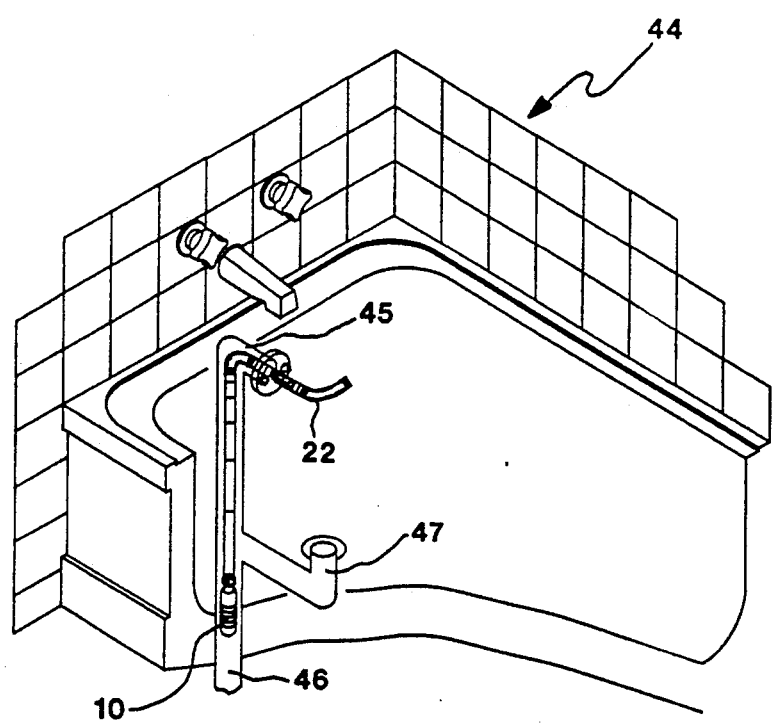
FIG. 11 is a perspective view of a bathtub and showing the drain flusher in use to clear a drain pipe.

FIGS. 10 and 11 show the drain flusher 10 used in a sink 40 and bathtub assembly 44, respectively. The drain flusher can be used to clean sinks, laundry tubs, bathtub drains, shower stalls, floor drains, main house drain piping, roof drain gutters, swimming pool drains, and the like. When cleaning sinks 40 and laundry tubs, as shown in FIG. 10, the drain screen is removed and the flusher 10 is inserted into the drain pipe 42 past the connection 43 to the second sink. The drain trap is removed, if necessary, and the drain flusher 10 is inserted directly into the drain pipe 42. For cleaning bathtub 44 drains, as shown in FIG. 11, the overflow mechanism is initially removed and the flusher 10 is inserted into the overflow pipe 45 past the base drain 47 and into drain pipe section 46. For cleaning shower stalls and floor drains, the drain screen or plate is removed and the drain flusher is inserted into the drain pipe. For cleaning main house drain piping, the flusher is inserted as far as possible into the pipe, i.e., 4 feet minimum. For this type of cleaning process, extra insertion distance is required. For cleaning roof gutters, the drain flusher is inserted as far as possible into the drain pipe. When cleaning swimming pool drains, the drain flusher is inserted directly into the pool overflow drain. The drain flusher according to the teachings of this invention provides a simple and economical device to dislodge obstructions in household plumbing, appliances and like environments.

As many changes are possible to the embodiments of this invention, utilizing the teachings thereof, the description above and the accompanying drawings should be interpreted in the illustrative and not in the limited sense.

That which is claimed is:

1. A drain flusher device for connection to a water pressure source of 50-90 p.s.i.g. for the expansive positioning in a conduit and for subsequently delivering a concentrated fluid spray from the front end of a flexible body, said drain flusher device further comprising:
   a. a unitary flexible cylindrical body of a specified diameter range with opposing ends and having a thickened end wall at one said end and a thickened open end wall at the opposite end, said flexible cylindrical body further having a diameter ranging from approximately 0.75 to approximately 3.25 inches and being for use in pipelines ranging from one to six inches in diameter.
   b. a flexible elongated slit through said thickened end wall, said flexible elongated slit having an effective, predetermined length and width which is independent upon said body diameter range and having a length of approximately 0.250 inches and a width of approximately 0.030 inches, and
   c. connector means fixed to said flexible body thickened open end wall and being adapted for attachment to the water pressure source, whereby upon the introduction of water pressure into said flusher device, said flexible body initially seats in the conduit before said concentrated fluid spray is delivered through said flexible elongated slit.

2. The drain flusher device of claim 1, wherein said body has a specified side wall thickness and wherein said thickened end wall has a thickness that is 250-325 percent of said side wall thickness and wherein said elongated slit has a predetermined depth to yield a slit length to slit depth ratio of approximately 1.4-1.7 to one.

3. The drain flusher device of claim 2, wherein said flexible cylindrical body is constructed of an elastomeric material having a durometer range of 55-65 Shore A, an elongation of 300-550 percent and a minimum tensile strength of 1800 p.s.i.

4. The drain flusher device of claim 3, wherein said cylindrical body has a front end having a hemispherical configuration.

5. The drain flusher device of claim 1, wherein said thickened end wall of said cylindrical body has a flattened interior surface disposed around said elongated slit.

6. The drain flusher device of claim 1, wherein said body has an outside lateral surface having at least one circumferentially disposed sealing rib formed thereon.

7. A flexible drain flusher device for connection to a water pressure source of 50-90 p.s.i.g. comprising:
   a. a unitary flexible cylindrical body having a specified diameter, a side wall and opposing ends, one said end being open and said opposing end having a thickened end wall, said thickened end wall further having a hemispherical configuration,
   b. an elongated slit through said thickened wall end, said elongated slit having a width of approximately 0.030 inches and a length of approximately 0.250 inches, and
   c. connector means attached to said body open end and being adapted for attachment to the water pressure source.

8. The drain flusher device of claim 7, wherein said cylindrical body has a predetermined side wall thickness and wherein said thickened end wall has a thickness that is 250-325 percent of said side wall thickness.

9. The drain flusher device of claim 8, wherein said cylindrical body is constructed of an elastomeric material having a durometer range of 55-65 Shore A, an elongation of 300-550 percent and a minimum tensile strength of 1800 p.s.i.

10. The drain flusher device of claim 9, wherein the interior surface of said thickened wall end has a flattened interior surface disposed around said elongated slit.

11. The drain flusher device of claim 7, wherein said open end has an extension with a reduced diameter with respect to said specified body diameter.

12. The drain flusher of claim 7, wherein said elongated slit has a length to width ratio of approximately 7.75-8 to one and a length to depth ratio of approximately 1.4-1.7 to one.

13. The drain flusher device of claim 11, wherein said connector means is mounted on said open end extension.

14. The drain flusher device of claim 7, wherein said connector means is a threaded water hose connector.

15. The drain flusher device of claim 7, wherein said body open end has a thickened wall.

16. A flexible drain flusher device for expansive positioning in a conduit and for delivering a concentrated spray from a single opening in the front end of a flexible body and being constructed and arranged for operation with a water source having a pressure of 50-90 p.s.i.g. comprising:
   a. a unitary flexible cylindrical body of a specified diameter range and having a thickened end wall and an opposing open end, said body further having a specified side wall thickness and said thickened end wall having a thickness that is approximately 250-325 percent of said side wall thickness,
   b. A single elongated slit through said body thickened end wall, said elongated slit having a length of approximately 0.250 inches and a width of approximately 0.030 inches, and c. connector means fixed to said flexible body open end and being adapted for attachment to the pressurized water source.

17. The drain flusher device of claim 16, wherein said flexible cylindrical body is constructed of an elastomeric material and wherein said body has an outside lateral surface having at least one circumferentially disposed sealing rib formed thereon.

18. The drain flusher device of claim 17, wherein said elastomeric material has a durometer range of 55–65 Shore A, an elongation of 300–550 percent and a minimum tensile strength of 1800 p.s.i.

19. The drain flusher device of claim 18, wherein said cylindrical body has a front end having a hemispherical configuration and wherein said thickened end wall has a flattened interior surface disposed about said elongated slit.

20. The drain flusher device of claim 19, wherein said specified diameter range of said cylindrical body is approximately 0.75 to approximately 3.25 inches and for use in conduits ranging from approximately one to six inches in diameter.

* * * * *